(12) United States Patent
Seo et al.

(10) Patent No.: US 8,154,642 B2
(45) Date of Patent: Apr. 10, 2012

(54) APPARATUS AND METHOD FOR CONTROLLING IMAGE SENSOR OUTPUT

(75) Inventors: Sungha Seo, Pyeongtaek-si (KR); Chol Min, Pyeongtaek-si (KR); Jongtae Choi, Pyeongtaek-si (KR); Namkyu Ahn, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 12/478,308

(22) Filed: Jun. 4, 2009

(65) Prior Publication Data
US 2009/0303372 A1    Dec. 10, 2009

(30) Foreign Application Priority Data
Jun. 5, 2008 (KR) .................. 10-2008-0052935

(51) Int. Cl.
*H04N 3/14* (2006.01)
*H04N 5/335* (2011.01)
(52) U.S. Cl. ................... 348/312; 348/321; 348/323
(58) Field of Classification Search .............. 348/312, 348/321, 323
See application file for complete search history.

(56) References Cited

U.S. PATENT DOCUMENTS

| | | | | |
|---|---|---|---|---|
| 5,402,173 A | * | 3/1995 | Noguchi et al. | 348/322 |
| 5,585,620 A | * | 12/1996 | Nakamura et al. | 250/208.1 |
| 6,795,119 B1 | * | 9/2004 | Oda et al. | 348/273 |
| 7,154,552 B1 | * | 12/2006 | Watanabe | 348/362 |
| 2005/0140806 A1 | * | 6/2005 | Nam | 348/311 |
| 2008/0088725 A1 | * | 4/2008 | Matsunaga | 348/302 |

* cited by examiner

*Primary Examiner* — Jordan Schwartz
(74) *Attorney, Agent, or Firm* — Birch, Stewart, Kolasch & Birch, LLP

(57) ABSTRACT

An apparatus and method for controlling an image sensor output are discussed. When a certain number of valid pixels of an image sensor, such as a CCD, is selected, a corresponding timing parameter is calculated. Signal values output from charge wells respectively corresponding to unit cells of the image sensor are separated or merged and then output by using the calculated timing parameter. Therefore, an image of a user-defined number of valid pixels can be varied and output in various ways, and all electric charges that are photoelectrically converted by the maximum number of valid pixels of the image sensor can be efficiently used.

7 Claims, 5 Drawing Sheets

APPARATUS AND METHOD FOR CONTROLLING IMAGE SENSOR OUTPUT

This nonprovisional application claims priority under 35 U.S.C. §119(a) from Patent Application No. 10-2008-0052935, filed in the Republic of Korea on Jun. 5, 2008, the entire contents of which are hereby incorporated by reference.

BACKGROUND OF THE INVENTION

1. Field of the Invention

This document relates to an apparatus and method for controlling an image sensor output, and more particularly, to an apparatus and method for enabling the output of an image sensor, such as a charge coupled device (CCD), to be varied in accordance with a user-defined number of valid pixels.

2. Discussion of the Related Art

Generally, a camera that shoots still or moving pictures uses an image sensor such as a CCD.

A CCD has a fixed number of pixels. Generally, the image resolution varies with the number of pixels in the CCD. For example, a CCD with 2M (Mega) pixels generally can output a high resolution image of 1920×1080, while a CCD with fewer pixels can output a lower resolution image.

In a conventional camera, when it is desired to vary the resolution of an image output from the CCD, generally, an analog signal output from the CCD is converted into a digital signal. Then sub-sampling is performed when processing the digital signal, thereby producing an image of a desired (lower) resolution.

In this case, however, the output of the CCD is inefficiently wasted, and noise is introduced due to the use of the memory, thus degrading the quality of the image.

In addition, there is a method of varying the resolution of the output image by a partial readout operation in which a part of the analog signal output from the CCD is selected, converted into a digital signal and processed.

In this case, however, only a part of the maximum number of valid pixels is used, and thus electric charges that are photoelectrically converted by the CCD are inefficiently wasted.

SUMMARY OF THE INVENTION

Therefore, the present invention has been made in an effort to address the aforementioned problems and other limitations associated with the related art. Specifically, an aspect of this document is to describe an apparatus and method for controlling an output of an image sensor (such as a CCD) that can efficiently output an image of a pixel size corresponding to a user-selected number of valid pixels by selectively merging charge wells respectively corresponding to unit cells of the image sensor.

According to an embodiment, the present invention provides a method for controlling an image sensor output. The method calculates a timing parameter corresponding to a selected number of valid pixels of an image sensor, and separates or selectively adds signal values output from charge wells respectively corresponding to unit cells of the image sensor using the calculated timing parameter.

The selected number of the valid pixels may be less than the maximum number of valid pixels of the image sensor.

Further, the method may include adding the signal values output from the charge wells in at least one of a vertical direction and a horizontal direction of the unit cells of the image sensor.

The method may further include separating and outputting all of the signal values from the charge wells respectively corresponding to unit cells of the image sensor if the selected number of valid pixels is equal to the maximum number of valid pixels of the image sensor.

Further, the signal values output from the charge wells may be separated or added by at least one of a vertical MUX and a horizontal MUX.

Furthermore, the present invention provides an apparatus for controlling an image sensor output. The apparatus may include a vertical readout portion and a horizontal readout portion for reading out electric charges charged in vertical and horizontal cells of an image sensor, and a timing generator. The apparatus may further include a vertical MUX and a horizontal MUX configured to separate or selectively add signal values respectively output from charge wells corresponding to the vertical cells and the horizontal cells, and a MUX controller configured to operatively control the vertical MUX and the horizontal MUX to output an image of a selected number of valid pixels.

The MUX controller may calculate a timing parameter and may output respective signal values from the charge wells based on the calculated timing parameter, where the signal values correspond to the selected number of valid pixels, the selected number being less than the maximum number of valid pixels of the image sensor.

Further, the MUX controller may separate and output all of the signal values output from the charge wells respectively corresponding to unit cells of the image sensor, if the selected number of valid pixels is equal to the maximum number of valid pixels of the image sensor.

In the present invention, when a certain number of valid pixels of an image sensor, such as a CCD, is selected, a timing parameter is calculated, and then charge wells respectively corresponding to unit cells of the image sensor are selectively merged and output by using the calculated timing parameter. Therefore, an image of a user-defined number of valid pixels can be varied and output in various ways, and all electric charges that are photoelectrically converted by the maximum number of valid pixels of the image sensor can be efficiently used.

BRIEF DESCRIPTION OF THE DRAWINGS

Implementations of this document will be described in detail with reference to the following drawings in which like reference numerals refer to like elements.

DETAILED DESCRIPTION OF THE INVENTION

Hereinafter, an exemplary embodiment of an apparatus and method for controlling an image sensor output according to the present invention will be described in detail with reference to the accompanying drawings.

First, the apparatus and method for controlling an image sensor output according to the present invention, as described below with reference to FIG. 1 for example, can be applied to various types of cameras that shoot moving pictures by using an image sensor such as a CCD.

Figure 1:
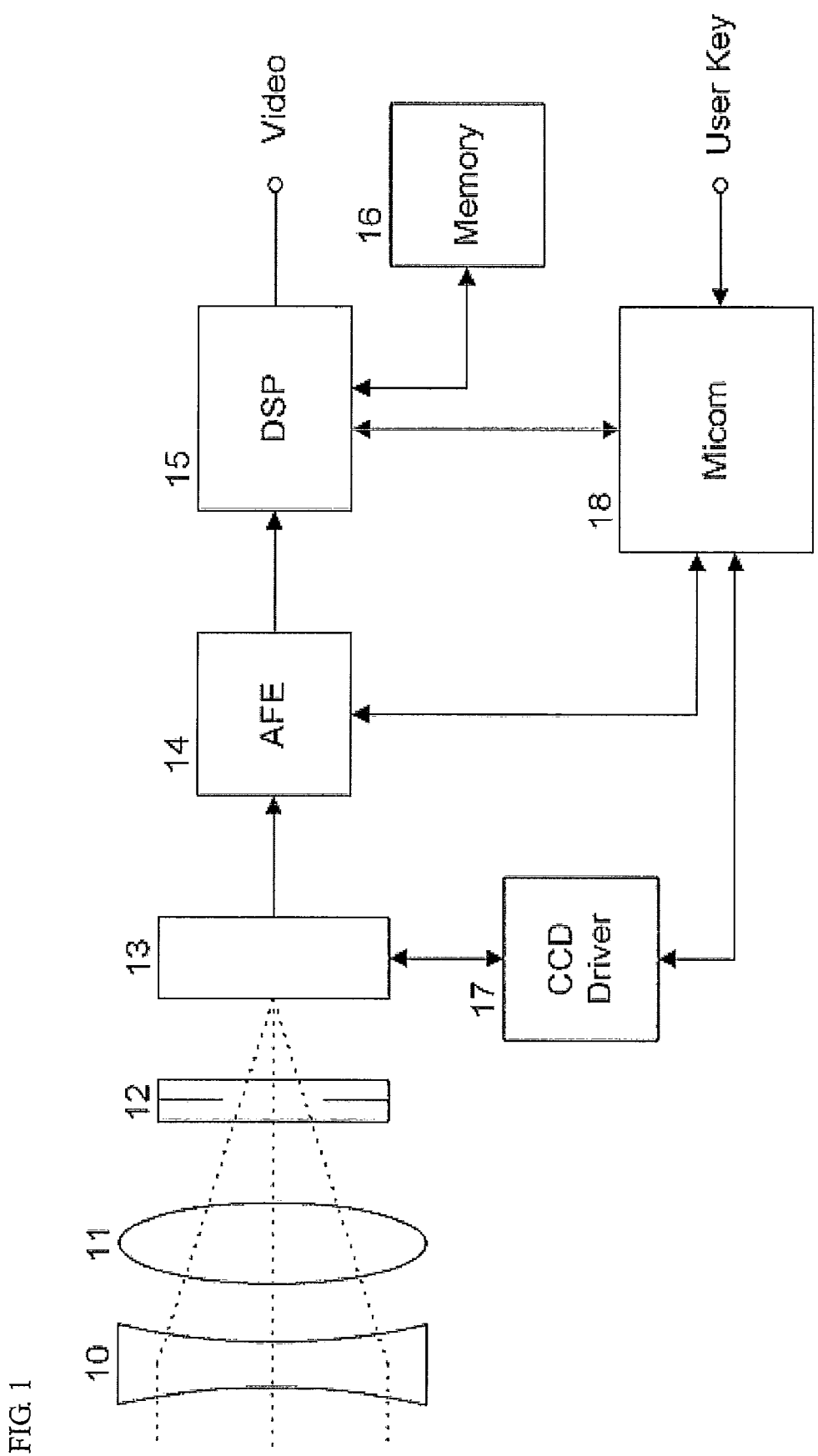
FIG. 1 illustrates a configuration of a camera.

FIG. 1 is a block diagram illustrating a camera to which the present invention is applied.

The camera includes a zoom lens 10, a focus lens 11, an iris 12, a CCD 13, an analog front end (AFE) 14, a digital signal processor 15, a memory 16, a CCD driver 17, a microcomputer 18, and so on.

For example, a 2M (Mega) pixel CCD can be used as the CCD 13. In this case, a high-resolution image of 1920×1080 pixel size can be output.

Figure 2:
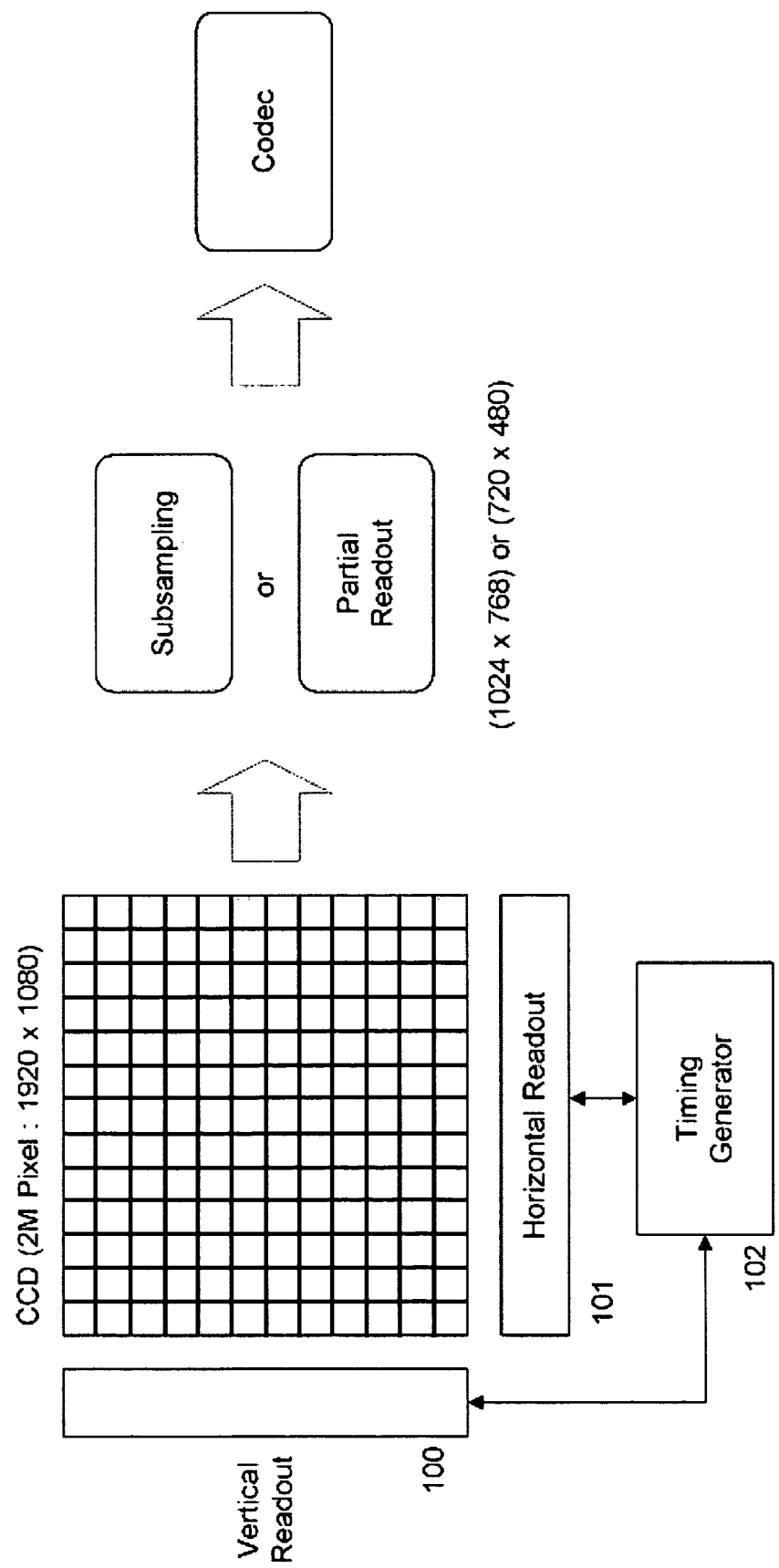
FIG. 2 illustrates a part of a configuration of a camera to which the present invention is applied.
Figure 3:
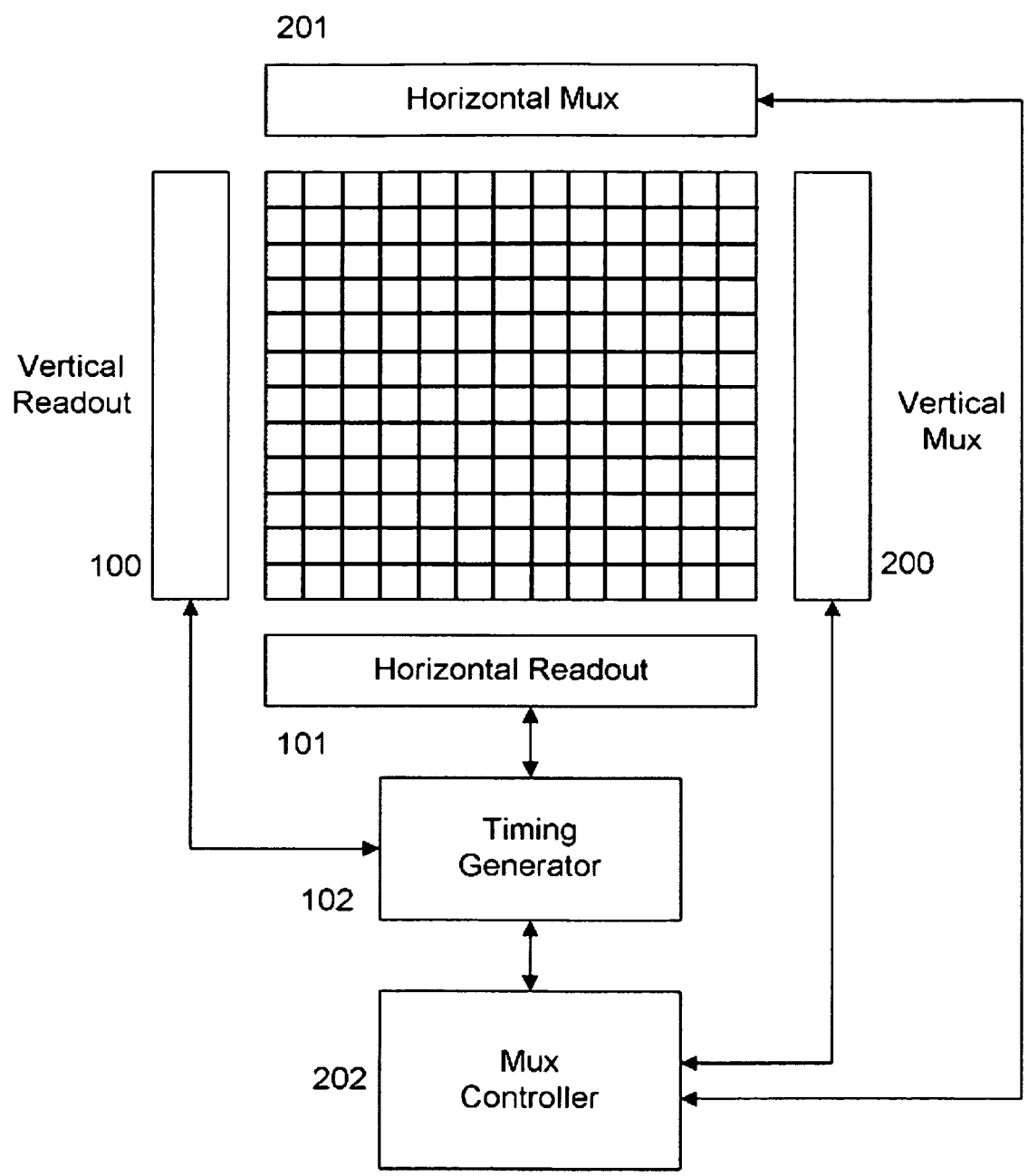
FIG. 3 illustrates another part of a configuration of a camera to which the present invention is applied.

The CCD shown in FIG. 2 may be CCD 13. The CCD shown in FIG. 2 includes a vertical readout portion 100, a horizontal readout portion 101, and a timing generator 102. Further, the CCD shown in FIG. 2 may include a vertical MUX 200, a horizontal MUX 201, and a MUX controller 202, as shown in FIG. 3.

The MUX controller 202 operatively controls the vertical MUX 200 and the horizontal MUX 201 so that analog signal values generated by charge wells respectively corresponding to unit cells of the CCD are selectively added.

The vertical readout portion 100 and the horizontal readout portion 101 each may include a register having a number of taps corresponding to the maximum number of effective pixels of the CCD.

Additionally, the vertical MUX 100 and the horizontal MUX 101 may be provided with registers respectively connected to the vertical readout portion 100 and the horizontal readout portion 101 to receive analog signal values output from the vertical readout portion 100 and the horizontal readout portion 101, and a plurality of adders for adding these values. The number of taps of the registers respectively provided in the vertical MUX 200 and the horizontal MUX, like the number of taps respectively provided in the vertical readout portion 100 and the horizontal readout portion 101, may be equal to the maximum number of valid pixels of the CCD.

When a certain number of pixels is selected and designated, e.g., by a user or by a controller based on user-defined criteria or based on predefined criteria, the MUX controller 202 operatively controls the timing generator 102 to vary timing pulses applied to the vertical readout portion 100 and the horizontal readout portion 101. For example, the user may select a specific number of pixels or a resolution that corresponds to a number of pixels. At this time, the user may make the selection via buttons and/or a display screen (not shown) of the camera. Alternatively, the microcomputer 18 which functions as a controller for controlling elements of the camera may determine a specific number of pixels or a resolution that corresponds to a number of pixels in consideration of capacity of the memory 16 for example.

The MUX controller 202 varies timing pulses such that the timing pulses decrease in proportion to, for example, a decrease in the resolution of an output image.

The adders provided in the vertical MUX 200 and the horizontal MUX 201 may be configured to add pairs of analog signals output from each tab of each register of the vertical readout portion 100 and the horizontal readout portion 101.

Moreover, the vertical MUX 200 and the horizontal MUX 201 may be operated such that some of the analog signal values are added and the other analog signal values are output, when respectively output from the vertical readout portion 100 and the horizontal readout portion 101. In one embodiment, this addition occurs by operating only even-numbered adders among the plurality of adders respectively provided in the vertical MUX 200 and the horizontal MUX 201, or operating only every third adder.

For these operations of the vertical MUX 200 and the horizontal MUX 201, the MUX controller 201 calculates the number and position of adders to be turned on/off and controls the turning on/off of each adder.

Figure 4:
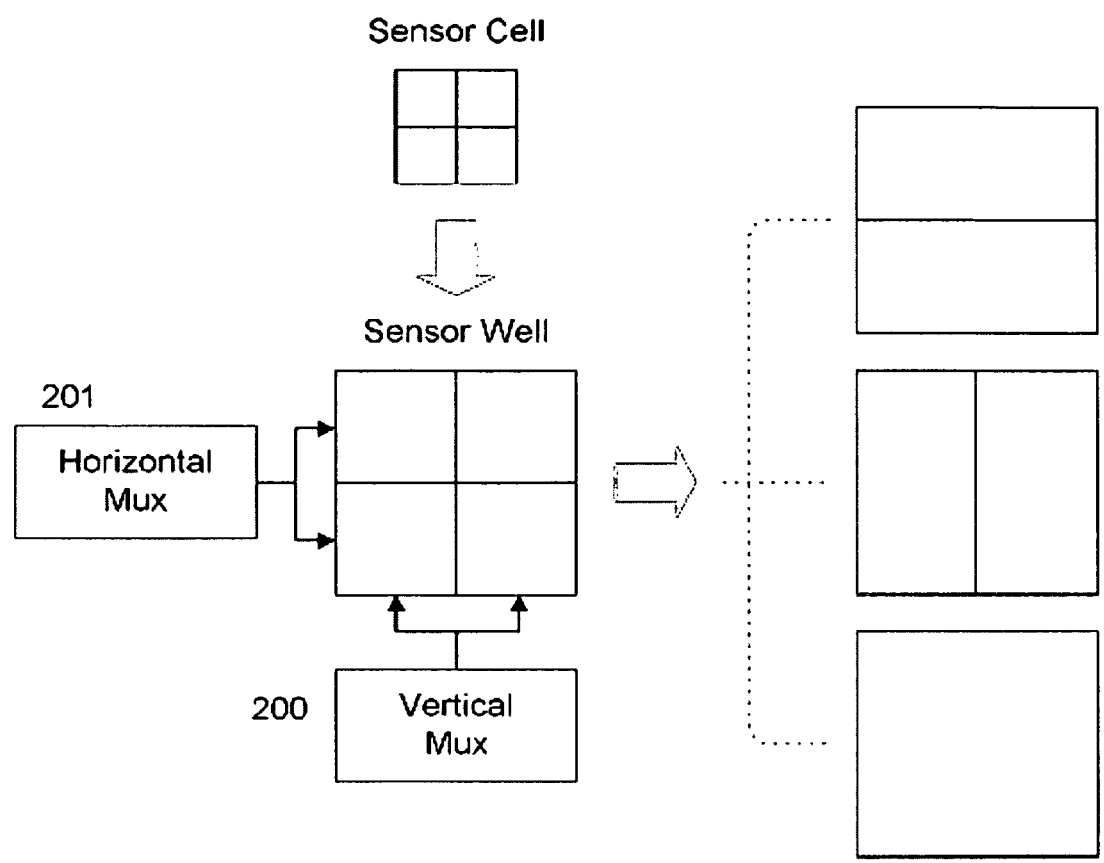
FIG. 4 illustrates an exemplary embodiment of an image sensor output control process in the camera to which the present invention is applied.

FIG. 4 is a view for explaining a method of adding signal values of neighboring sensor cells in the vertical MUX 200 and the horizontal MUX 201.

For example, as shown in FIG. 4, signal values generated by electric charges charged by four sensor wells respectively corresponding to four sensor cells may be added in a vertical direction, a horizontal direction, or vertical and horizontal directions.

That is, it is possible to add only in a vertical direction. In this scenario, the adder of the horizontal MUX 201 is turned off and only the adder of the vertical MUX 200 is turned on. Thus, the vertical MUX 200 outputs one signal value obtained by adding output signal values of the vertical readout portion 100, and the horizontal MUX 201 outputs a value obtained by adding two output values of the horizontal readout portion 101.

Further, it is also possible to add in both vertical and horizontal directions. In this scenario, the adders of both of the vertical MUX 200 and the horizontal MUX 201 are turned on. Thus, the vertical MUX 200 outputs one signal value obtained by adding two output values of the vertical readout portion 100, and the horizontal MUX 201 also outputs a value obtained by adding two output values of the horizontal readout portion 101.

Consequently, in the above example, all of the electric charges that are photoelectrically converted by the four sensor cells can be used, and an image of a user-defined number of valid pixels can be efficiently output in various ways.

While the above description concerns an example in which values of two neighboring sensor cells are added, it is also possible to output an image of a user-defined resolution by varying the number and position of the sensor cells added as described above.

Figure 5:
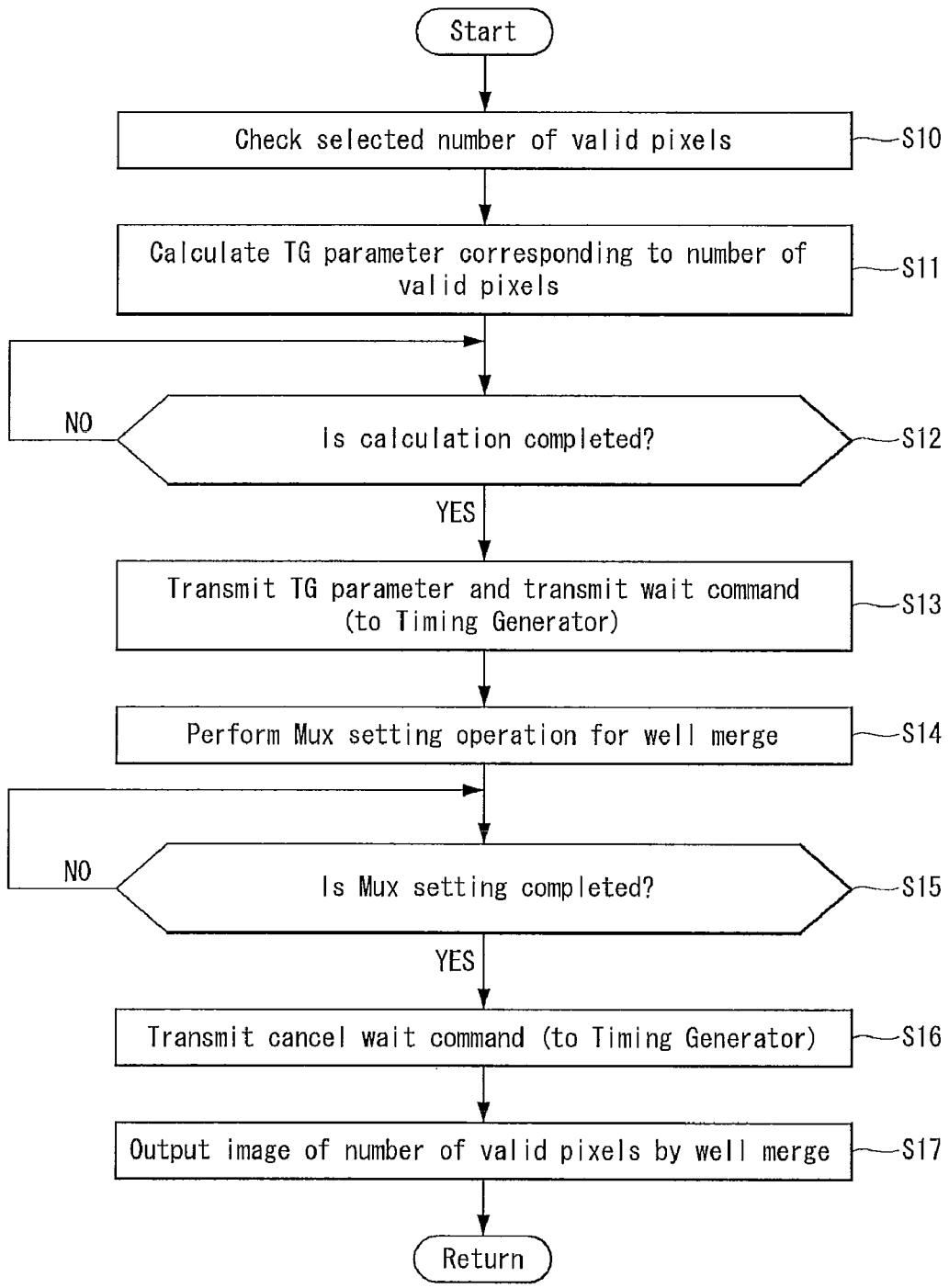
FIG. 5 is a flowchart of a method for controlling an image sensor output according to an embodiment of the present invention.

FIG. 5 is a flowchart of a method for controlling an image sensor output according to the present invention. For example, when a user-defined number of valid pixels, or a corresponding user-defined resolution, of an output image, the selected number of valid pixels is checked, or a number of valid pixels corresponding to the user-defined resolution is checked (e.g., by MUX controller 202) (S10).

Then, the maximum number of valid pixels of the CCD sensor and the selected number of valid pixels are compared (e.g., by MUX controller 202) and the number and position of adders to be turned on among the plurality of adders in corresponding MUX devices is calculated (e.g., the number and position of adders provided in the vertical MUX 200 and the horizontal MUX 201.)

Also, a timing pulse generation (TG) parameter corresponding to the selected number of valid pixels is generated (e.g., by the MUX controller 202) (S11).

For example, when the maximum number of valid pixels of the CCD is 1920×1080, if the user selects a number of valid pixels with a pixel size of 1024×768 or 720×480, a MUX controller (e.g., the MUX controller 202) calculates a timing pulse generation parameter corresponding to the number of valid pixels with the pixel size of 1024×768 or 720×480.

In this case, the timing pulse generation parameter may be the ratio of the selected number of valid pixels to the maximum number of valid pixels of the CCD, and the frequency of the timing pulse created according to the calculated timing pulse generation parameter may decreases corresponding to the calculated timing pulse generation parameter.

In addition, when the above calculation operation is completed (S12), the calculated timing pulse generation parameter is transmitted to a timing device (e.g., the MUX controller 202 transmits the parameter to the timing generator 102), and then a command to wait is transmitted (S13).

Then, a MUX setting operation is performed for properly adding analog signal values generated by electric charges charged in the sensor wells (S14). For example, the MUX controller 202 operatively controls the vertical MUX 200 and the horizontal MUX 201 to perform the MUX setting operation. Afterwards, when the MUX setting operation is completed (S15), a cancel wait command is transmitted to the timing generator 102 (S106).

Accordingly, an image of a user-defined number of valid pixels is output (S17). For example, the timing generator 102 operatively controls the vertical readout portion 100 and the horizontal readout portion 101 based on the timing pulse generation parameter, and the MUX controller 202 operatively controls the vertical MUX 200 and the horizontal MUX 201 to output the image having the user-desired number of valid pixels. Hence, even if an image of a smaller number of valid pixels than the maximum number of valid pixels of the CCD is output, all of the electric charges that are photoelectrically converted by the respective cells of the CCD can be efficiently used.

Meanwhile, if the user-selected number of valid pixels is equal to the maximum number of valid pixels, signal values generated by the electric charges charged in the respective cells are separated, output and read out (e.g., by MUX controller 202) as is without adding the signal values generated by the electric charges charged in the sensor wells, thereby enabling it to output an image of the maximum number of valid pixels, for example, with a pixel size of 1920×1080.

The above-described preferred embodiments of the present invention are disclosed for illustrative purposes. Those skilled in the art can achieve modifications, variations, substitutions or additions associated with various other embodiments within the spirit and technical scope of the present invention disclosed in the accompanying claims.

What is claimed is:

1. A method for controlling an image sensor output, comprising:
    generating signal values from all of charge wells respectively corresponding to unit cells of an image sensor;
    calculating a proportional parameter corresponding to a selected number of pixels; and
    separating or selectively adding signal values output from all of the charge wells of the image sensor using the calculated proportional parameter.

2. The method of claim 1, wherein the selected number of the valid pixels is less than a maximum number of pixels of the image sensor.

3. The method of claim 2, wherein the step of separating or selectively adding comprises:
    separating or selectively adding the signal values output from all of the charge wells of the image sensor in at least one of vertical and horizontal directions of the image sensor.

4. The method of claim 1, wherein the step of separating or selectively adding comprises:
    separating and outputting the signal values output from all of the charge wells of the image sensor if the selected number of valid pixels is equal to a maximum number of pixels of the image sensor.

5. The method of claim 1, wherein the step of separating or selectively adding comprises:
    separating or selectively adding the signal values output from all of the charge wells of the image sensor by at least one of a vertical multiplexer (MUX) and a horizontal MUX.

6. An apparatus configured to control an image sensor output having a vertical readout portion and a horizontal readout portion for reading out electric charges of corresponding vertical and horizontal cells of an image sensor, and a timing generator, the apparatus comprising:
    a vertical multiplexer (MUX) and a horizontal MUX configured to separate or selectively add signal values respectively output from charge wells corresponding to the vertical cells and the horizontal cells; and
    a MUX controller operatively connected to the vertical MUX and the horizontal MUX, the MUX controller configured to calculate a proportional parameter and to control the vertical MUX and the horizontal MUX to output an image corresponding to a selected number of pixels by outputting the signal values based on the calculated proportional parameter,
    wherein the selected number of valid pixels is less than a maximum number of pixels of the image sensor.

7. The apparatus of claim 6, wherein the MUX controller is configured to separate and output all of the signal values respectively output from the charge wells corresponding to the vertical cells and the horizontal cells if the selected number of valid pixels is equal to the maximum number of valid pixels of the image sensor.

* * * * *